United States Patent [19]

Waller et al.

[11] Patent Number: 4,777,383

[45] Date of Patent: Oct. 11, 1988

[54] ELECTRICALLY CONTROLLED VARIABLE PRESSURE PNEUMATIC CIRCUIT

[75] Inventors: Michael V. Waller, Newnan, Ga.; David M. Palance, Milford, N.H.

[73] Assignee: LDI Pneutronics Corp., E. Pepperell, Mass.

[21] Appl. No.: 56,916

[22] Filed: Jun. 1, 1987

[51] Int. Cl.⁴ ............................................. F16K 17/20
[52] U.S. Cl. ................................ 307/118; 137/487.5; 137/557; 290/40 R; 364/510
[58] Field of Search ................... 307/118; 251/129.01, 251/129.04, 129.08, 129.16, 65,66, 67, 68, 69, 73, 129.02; 137/82, 85, 455, 456, 457, 486, 487.5, 492.5, 505, 624.13, 624.15, 624.14, 624.18, 554, 884, 458, 459, 460, 551, 557, 558, 559; 73/40, 49.2, 151; 361/152, 155, 156, 160, 191; 364/510, 509, 165, 164; 290/40 R, 40 A, 40 B, 40 C, 40 E

[56] References Cited

U.S. PATENT DOCUMENTS

| | | | |
|---|---|---|---|
| 3,552,428 | 1/1971 | Pemberton | 364/510 X |
| 3,628,563 | 12/1971 | Tomita | 137/487.5 X |
| 3,726,307 | 4/1973 | Carman et al. | 137/487.5 |
| 3,775,622 | 11/1973 | Fredericks et al. | 307/118 |
| 3,963,043 | 6/1976 | Cota et al. | 137/557 X |
| 4,043,355 | 8/1977 | Cerruti et al. | 137/557 X |
| 4,114,084 | 9/1978 | Glaudel et al. | 290/40 R X |
| 4,174,729 | 11/1979 | Roark et al. | 137/557 X |
| 4,215,746 | 8/1980 | Hallden et al. | 137/458 X |
| 4,277,832 | 7/1981 | Wong | 364/510 |
| 4,345,612 | 8/1982 | Koni et al. | 137/554 X |
| 4,364,413 | 12/1982 | Bersin et al. | 364/510 X |
| 4,372,334 | 2/1983 | Paul, Jr. | 137/557 X |
| 4,446,410 | 5/1984 | Yagura et al. | 361/152 X |
| 4,587,619 | 5/1986 | Converse, III et al. | 73/49.2 X |
| 4,658,855 | 4/1987 | Doyle | 137/487.5 X |
| 4,679,583 | 7/1987 | Lucas et al. | 137/487.5 X |
| 4,679,585 | 7/1987 | Ewing | 137/487.5 X |

Primary Examiner—William M. Shoop, Jr.
Assistant Examiner—Paul Ip
Attorney, Agent, or Firm—Christopher H. Morgan

[57] ABSTRACT

A pneumatic circuit pressure control device including an electronic comparator for comparing a transducer generated pressure signal from the pneumatic circuit and a desired pressure signal from a desired pressure input generator. The comparison circuit selectively actuates a solenoid-actuated valve which controls the pressure in the pneumatic circuit. Preferably, the solenoid of the solenoid-actuated valve produces an electromagnetic field for electromagnetic induction of a circuit which oscillates the solenoid-actuated valve to produce a variable orifice-like effect when small changes in pressure are demanded by the comparator circuit.

4 Claims, 1 Drawing Sheet

ELECTRICALLY CONTROLLED VARIABLE PRESSURE PNEUMATIC CIRCUIT

BACKGROUND OF THE INVENTION

1. Field of the Invention

The present invention relates generally to pneumatic circuits and more particularly to devices for controlling pressure in pneumatic circuits.

2. Description of the Prior Art

In the field of pneumatic circuits it is often desirable to change the pressure in the circuit and to maintain it at the desired pressure until a new pressure setting is required. For example, in an industrial robot where a pneumatically driven robot hand mechanically positions and holds workpieces, it may be desired to have successive or adjustable holding operations requiring different holding pressures. By changing the pressure in the pneumatic circuit driving the robot hand, these different holding pressures can be achieved.

In the past, changing the pressure in a pneumatic circuit has been troublesome. Most controls for the circuit pressure are mechanical. These mechanical pressure control devices usually control pressure by constantly venting through a small orifice and then making up pressure through a valve to a high pressure source when the circuit pressure falls below a set level because of the constant loss. This wastes energy necessary to pressurize the gas which is constantly being vented and produces a constantly changing circuit pressure about the desired pressure.

Other systems mechanically or electrically control valves which vent from the circuit or supply pressurized gas to the circuit based upon upper and lower pressure settings. The problem with these systems is that it is easy to improperly set one of the control settings relative to the other so that they are too close. When this occurs, the system oscillates out of control. Also, since either one of the controls can fail, the system can fail with a maximum pressure supply in the circuit or no pressure in the circuit. Usually, it is desired to have a failure in only one of the two manners so that disastrous results are avoided.

Another problem with controlling pneumatic systems, regardless of the method of control, is cost. The most desirable place for a control device is at a point where the pressure regulation is needed. This, however, means that a separate control device must be positioned at every point of pressure operation. Effective control of a pneumatic circuit of this type thus requires a large number of controllers. Unless the cost of the controllers is relatively low, such a system becomes uneconomical. Thus, although the solutions to the problems described might be possible using expensive equipment, such solutions are not usable because of their cost.

One particular cost problem which relates to the problem of system control is response speed to a signalled or desired pressure change. Generally, it is necessary to have a fast response time so that a desired pressure change will achieve its desired results. However, in systems with both venting and pressuring valves, a fast response means a large "dead band" between the operation of the valves is necessary to prevent uncontrolled oscillation of the two valves. Thus, the fast response time prevents fine control. While a variable orifice valve could be used to provide both fine control and fast response, such valves are expensive and the equipment to drive these valves is also expensive. Finally, such valves are too large for many pneumatic circuit operations.

SUMMARY OF THE INVENTION

It is accordingly an object of the present invention to provide a pneumatic circuit pressure control with an improved electrical control device for controlling the circuit pressure.

It is also an object of the present invention to provide an improved pneumatic circuit pressure control wherein the rate of response adjusts to the rate of pressure change demanded.

It is also an object of the present invention to provide a pneumatic circuit pressure control device which has a relatively low cost and is simple in its construction and operation.

In accordance with these objects the present invention includes a pneumatic circuit with a first signal means attached thereto for determining the circuit pressure and producing a first electrical signal proportional thereto. A second means is provided for determining a desired pneumatic circuit pressure and producing a second electrical signal proportional thereto. An exhaust valve is connected to the pneumatic circuit to reduce the pressure therein when actuated and a pressure valve is connected to a pressure source and the pneumatic circuit to increase the pressure in the circuit when actuated. A comparator circuit compares the first and second electrical signals and actuates the exhaust valve to reduce circuit pressure if the desired pressure is lower than the determined circuit pressure. The comparator circuit actuates the inlet valve to increase the circuit pressure if the comparison indicates the desired pressure is higher than the circuit pressure.

Preferably, at least one of the valves is solenoid-actuated and the solenoid of the valve produces an electromagnetic field when operating. An electronic circuit means is disposed within the electromagnetic field so that electromagnetic induction in said electronic circuit can adjust the signal to the solenoid producing an oscillation of the solenoid actuation when a small pressure change is desired to be produced by the valve. The oscillation of the valve operation is of such a frequency that the valve operates as a variable orifice valve because of this oscillation when small pressure changes are demanded.

For a further understanding of the invention and further objects, features and advantages thereof, reference may now be had to the following description taken in conjunction with the accompanying drawings.

BRIEF DESCRIPTION OF THE DRAWINGS

The FIGURE is a schematic representation of a pneumatic circuit control constructed in accordance with the present invention.

DESCRIPTION OF PREFERRED EMBODIMENTS

Figure 1:
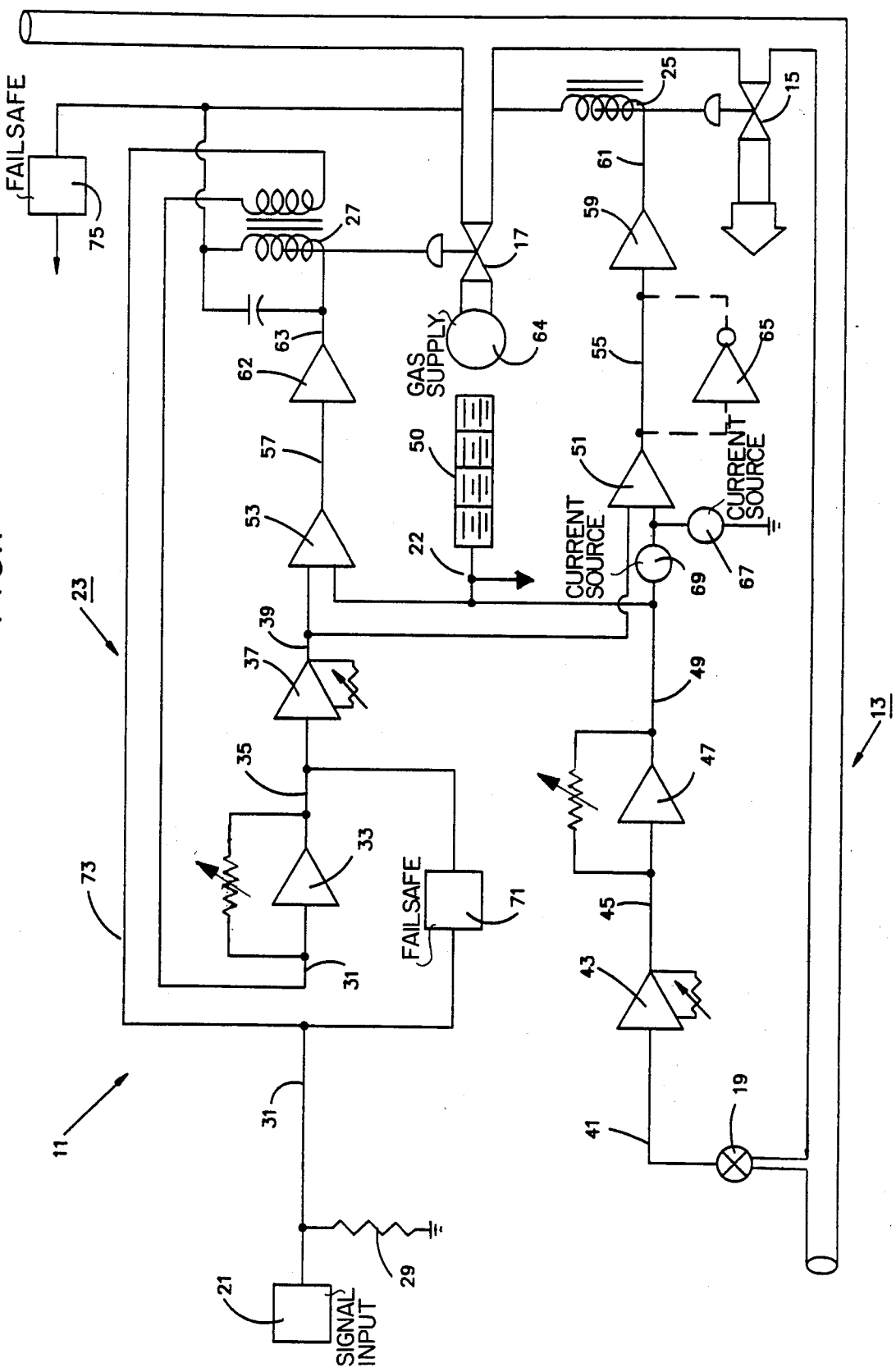

Referring now to the FIGURE, a schematic drawing of the invention is shown generally at 11. The circuit includes a pneumatic conduit 13 which carries a pressurized gas. The conduit 13 is a part of a pneumatic circuit which supplies gas to a desired location such as an industrial robot.

An exhaust valve 15 and a pressure valve 17 are provided on the conduit 13. These valves are utilized by the present invention to adjust the pneumatic pressure in the conduit 13 and the pneumatic circuit of which it is a part. A transducer 19 is connected to the conduit 13 for determining the gas pressure in the conduit 13 and producing an electrical signal proportional thereto. This signal together with the signal produced by a control input device 21 are used to control the operation of the exhaust and pressure valves 15 and 17.

The control input device 21 may be a manually operated device or may be automatically operated by a remote computer or the like. If manually operated, the device would include a calibrated dial or the like so that a desired setting can be read at the time of manual operation. If remotely operated a return signal 22 indicating the demand for a pressure change and the current pressure can be utilized to improve the remote operation.

To provide the control of exhaust and pressure valves 15 and 17 responsive to the signals generated by transducer 19 and control input device 21, a comparator circuit 23 is utilized. The comparator circuit 23 adjusts the voltage or current in the signals so that they may be directly compared, then compares the two signals and electrically actuates either or neither of the valves 15 or 17 by means of solenoids. Thus, valves 15 and 17 are solenoid-actuated valves operated by solenoids 25 and 27, respectively.

The comparator circuit 23 may be either voltage or current comparing. As shown in FIG. 1 the resistor 29 connected to the control input device 21 results in a variable current signal 31. If the resistor 29 were removed, the control input device 21 would provide a variable voltage signal 31. A typical current signal 31 will be from 4 to 20 milliamps. A typical voltage signal 31 would be from 1 to 5 volts D.C.

The control signal 31 is introduced to a voltage amplifier 33. The voltage amplifier 33 is adjustable so that the span of the control signal 31 can be varied. The output 35 of the voltage amplifier 33 is then introduced to a voltage amplifier 37 to adjust the zero or offset of the control signal. Thus, the output control signal 39 from the amplifier 37 is proportional to the signal from the control input device 21 with a desired amount of gain or span as set by amplifier 33 and a desired zero point as provided by amplifier 37.

The transducer 19 produces an electrical signal which is proportional to the pneumatic pressure in the conduit 13. This pressure signal 41 is introduced to a zero adjusting amplifier 43 with a variable offset so that the zero point of the signal 41 can be adjusted. The output of the amplifier 43 is a signal 45 which is introduced to an amplifier 47. The amplifier 47 is adjustable to set the gain of the pressure signal. Thus, the pressure signal 41 is adjusted by the amplifiers 43 and 47 for the span and zero point. Additionally, the amplifier 47 can be adjusted to correct these pressure signals for temperature changes. The output of the amplifier 47 is a pressure signal 49 which can be compared with the control signal 39. Signal 22, used to convey the present pressure in the conduit 13, can be derived from signal 49. A visual display of the current pressure can be provided by a display device 50.

Each of the signals 39 and 49 are introduced to comparison amplifiers 51 and 53. The comparison amplifier 51 produces an exhaust signal 55 if the control signal 39 indicates a desired pressure which is lower than the determined circuit pressure indicated by the pressure signal 49. Similarly, the comparator amplifier 53 produces an increase pressure signal 57 if the control signal 39 indicates a desired pressure which is higher than the determined circuit pressure indicated by signal 49.

When an exhaust signal 55 is produced an amplifier 59 alters the signal 55 to an electrical signal 61 with a voltage and current able to power solenoid 25 which actuates the solenoid actuated exhaust valve 15. Thus, the exhaust signal 55 opens the exhaust valve 15 and reduces the pressure in the conduit 13 and its pneumatic circuit.

When an increased pressure signal 57 is generated, it is introduced to an amplifier 62 which produces an electrical signal 63 having a voltage and current to power pressure valve solenoid 27. This opens the valve 17 allowing pressurized gas from a gas supply 64 to enter conduit 13 and increase the gas pressure therein. Thus, an increased pressure signal 57 operates the solenoid-actuated valve 17 to increase the pressure in the pneumatic circuit.

As can be seen, both the valves 15 and 17 are normally closed. However, an inverter amplifier such as amplifier 65 can be provided if valve 15 is normally open. Valve 15 would be normally open if the safe mode for total electrical failure was an exhausted system. If it is desired to maintain system pressure upon total electrical failure, valve 15 should be normally closed.

In order to prevent the valves 15 and 17 from constantly oscillating, a dead band region between generating the signals 55 and 57 is desired. This dead band can be provided by current sources 67 and 69. The current sources 67 and 69 adjust the signal 49 entering amplifier 51 so that it is offset from the signal 49 entering amplifier 53 by the desired amount of offset.

The solenoid-actuated valves 15 and 17 are single-acting, i.e. they are not variable-orifice valves. The comparator circuit 23 selectively provides a signal to these valves and the signal is either an open-signal or a close-signal. Although variable orifice valves are known, generally these valves are too large and too expensive to have any use in applications where the pneumatic circuit pressure is in the range of 30 to 100 psi, the pneumatic circuit tubes are in the range of 0.003 inches to 0.006 inches in diameteror the cost of the valve must be less than $10.00.

A very serious problem with single-acting solenoid-actuated pneumatic valves is that a large dead band must be provided by the amplifiers 51 and 53 in order to prevent an out of control constant oscillation of the valves. However, by means of the control of present invention, a single-acting valve can be made to operate like a variable orifice valve by rapidly oscillating the actuate signal when only small pressure changes are required. In addition, rapid oscillation and variable orifice-like operation can be achieved with little or no additional equipment cost.

This effect of variable orifice operation is achieved by electromagnetic induction through the electromagnetic field generated by the solenoids of the valve 15 or 17 as they operate. As shown in the figure, only valve 17 is connected so that it operates like a variable orifice valve. Only one valve needs to be operated this way in order to prevent uncontrolled oscillation of the whole system. However, both valves 15 and 17 could be connected to operate this way if it were desired to provide even more sensitivity and an even smaller dead band between the signals 55 and 57.

The valve 17 has a solenoid 27 which actuates the opening and closing of the valve. Since valve 17 is normally closed, when solenoid 27 is actuated to open the valve 17, the solenoid holds the valve open. As it does so, the solenoid 27 generates an electromagnetic field.

By locating the circuitry of the comparator 23 so that an electrical conductor 73 of the comparator 23 which carries the control signal 31 is within this field, an induced electromagnetic force therein will change the signal 31 according to the direction and position of the conductor 73 in the field. By fixing this position so that the signal 31 is altered opposite the direction which would cause the signal to open valve 17, a rapid oscillation of the increase pressure signal 63 will result when the signal 39 is "close" to its compared signal 49. When signals 39 and 49 are sufficiently close, each time an increase pressure signal 63 begins to open the valve 17, the solenoid 27 operation reduces the signal 31 and signal 39 is reduced accordingly. This causes the comparison of signals 39 and 49 to be sufficiently close to stop the signal 63. When the electromagnetic field is turned off, however, the comparison again causes signal 63 to be generated.

The rapid oscillation of signal 63 causes the valve 17 to flutter open and this fluttering produces a slow pressure change as if the orifice of valve 17 were partially opened. Thus, the valve 17 acts like a variable orifice valve.

The oscillation of the valve must be sufficiently slow that the solenoid 27 may respond to move the valve but not so slow that the valve remains fully open during a long period of oscillation. For an unbalanced poppet valve with a 0.03 inch diameter orifice, an oscillation of 20 to 20,000 hertz is desirable with 40 to 4,000 hertz being more preferred.

In addition to the oscillation frequency, the duty ratio during an oscillation period affects the response of the valve (the average orifice opening during an opening and closing operation produced by a single oscillation). The duty ratio is the ratio of the portion oscillation cycle which has an open signal to that portion of the oscillation cycle which has a close signal. This duty ratio varies with the ratio of the signals 39 and 49 which are being compared to produce signal 63. If these signals are close, the duty ratio is small producing a low rate of gas entering the circuit through valve 17. If these signals are far apart, the duty ratio is high resulting in a higher rate of gas entering through valve 17. Thus, the pressure response of the control of the present invention varies with the demand during lower demand situations, so that the dead band can be small producing a very accurate control with no wasted energy. This is achieved with a very inexpensive circuit since the oscillation is achieved using only a conductor located within the electromagnetic field generated by the solenoid 27.

If the signal 39 is much greater than signal 49, the electromagnetic field generated by solenoid 17 does not sufficiently reduce the signals 31 and 39 to turn off signal 57. Thus, when a very rapid pressure increase is required, valve 17 of the present invention acts like a single-acting full open valve to provide the rapid pressure increase.

A failsafe device 71 is provided across the amplifier 33 and generates its own signal to be summed so that a predetermined signal 35 results in the event the voltage of signal 31 drops below a predetermined amount. Thus, if the power to the control input device 21 is lost or a tremendously erroneous signal 21 is being generated, the failsafe device 71 still supplies a desired pressure signal 39 to prevent the exhaust valve 15 from being continuously open and pressure in the pneumatic circuit lost.

A second failsafe device 75 is provided for those situations where a total power loss would result in a dangerous condition because of pressure changes. The failsafe device 75 senses the voltage of the system power and, if the voltage falls below a predetermined amount, both valves 15 and 17 are turned off so as to maintain the system pressure. For this failsafe device to maintain pressure, both valves 15 and 17 must be spring closed. Of course, in this condition of "maintain pressure" because of power loss, the comparator circuit will not function.

Thus, the improved variable pressure pneumatic circuit of the present invention is well adapted to achieve the objects and advantages mentioned as well as those inherent therein. It will be appreciated that the instant specification claims are set forth by way of illustration and not of limitation and that various changes and modifications may be made without departing from the scope of the present invention. What is claimed is:

We claim:

1. A control device for regulating flow of pressurized gas between two pressurized gas devices, comprising:
   a solenoid-actuated, non-variable orifice valve connected to control flow of pressurized gas between two gas devices, said solenoid-actuated valve having a solenoid which produces an electromagnetic field when operating;
   an electronic signal source for producing an electrical drive signal which controls said solenoid;
   electronic circuit means connecting said electronic signal source and said electromagnetic field generated by said solenoid for rapidly oscillating the operation of said solenoid to produce a valve operation like a variable orifice valve.

2. The control device of claim 1 wherein said electronic circuit means comprises an electronical conductor connected to said electronic signal source so that said electronic signal source is electrically responsive thereto, and wherein said electrical conductor is disposed within the electromagnetic field of said solenoid so that said electromagnetic field causes said oscillation by electromagnetic induction in said electrical conductor.

3. The control device of claim 1 wherein said electronic signal source comprises:
   first signal generating means for determining a sensed pressure in said pneumatic circuit and producing a first electrical signal proportional thereto;
   second signal generating means for determining a desired pressure in said pneumatic circuit and producing a second electrical signal proportional thereto; and
   comparator means for comparing said first and second electrical signals and selectively producing said electrical drive signal which controls said solenoid.

4. The control device of claim 3 wherein said first signal means comprises an electrical conductor disposed within said electromagnetic field of said solenoid so that said electromagnetic field causes said oscillation by electromagnetic induction in said electrical conductor.

* * * * *